United States Patent Office 3,450,988
Patented June 17, 1969

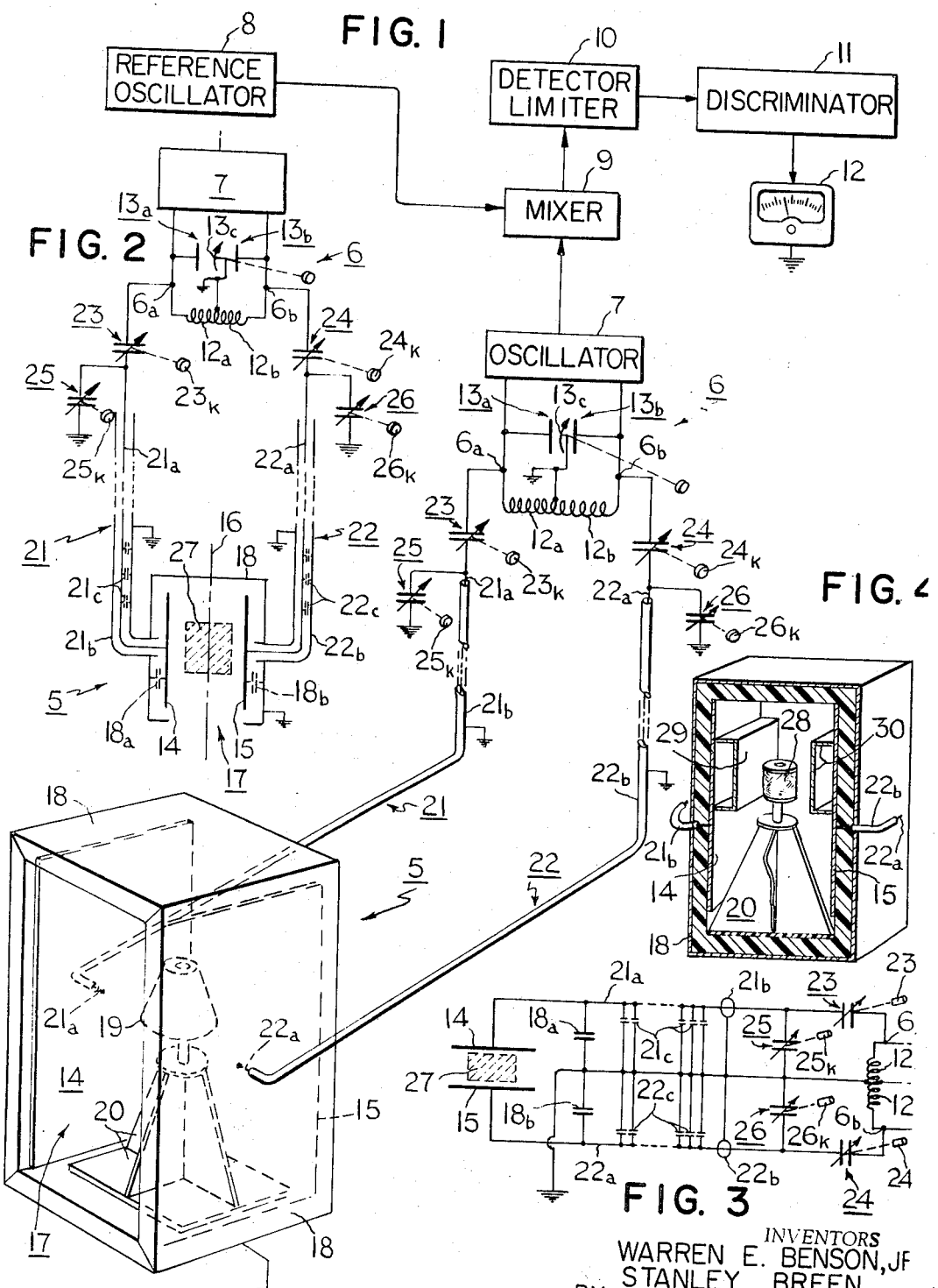

3,450,988
CAPACITOR TEST CELL APPARATUS INCLUDING ERROR-REDUCING COUPLING CABLES
Stanley Breen, Norwood, and Warren E. Benson, Jr., Needham, Mass., assignors, by mesne assignments, to Kingsbury Technology Inc., Norwood, Mass., a corporation of Delaware
Filed Dec. 21, 1966, Ser. No. 603,568
Int. Cl. G01r 27/26
U.S. Cl. 324—61
2 Claims

ABSTRACT OF THE DISCLOSURE

An opened test cell structure in which large-area partly-shielded electrode plates are each independently coupled with a different end of an associated tuned oscillator circuit by a coaxial cable.

---

The present invention relates to improvements in the sensing of properties of a substance through measurements of its so-called "capacitivity," i.e., its effect upon the capacity of an electrical capacitor, and, in one aspect, to novel and improved moisture detection apparatus of the type having an open capacitor test cell and including unique and advantageous provisions for developing an optimum distribution of electric-field potentials within the cell and for promoting desired sensitivities while suppressing losses and error-inducing variations in the couplings of the capacitor plates with their associated excitation circuitry.

As is now well known in the art, certain properties of materials, such as moisture content, dimensions, and composition, may be evaluated by inserting a sample of the material into an accommodating capacitor test cell, where it serves as a dielectric, and by measuring the resulting cell capacitivity exhibited in terms of the output of associated electronic detection equipment. That property which is of interest is isolated from or corrected in relation to the others which also affect the dielectric constant of the material, by separately measuring the others and taking them into account, or by preserving them essentially constant. Moisture content, which has long been computed on the basis of elementary baking and weighing practices, is a property of very special significance in a number of industries, and the possible advantages of swift and uncomplicated measurement of moisture content through electronic detection techniques have been highly attractive. By way of example, accurate determinations of the moisture contents of textiles, chemicals and foodstuffs will facilitate predictions of their processing and/or storage characteristics, and costly mistakes may thus be avoided. Measurement errors in the test cells and electronic detection equipments used for such purposes must be kept very low if the results are to be meaningful and reliable; this requirement is of course especially severe in apparatus which relies upon capacitive effects, because of the notorious difficulty of avoiding stray field variations such as those induced by changing environmental influences. To some extent, capacitance disturbances in the test cells themselves may be suppressed by designing them for full shielded enclosure, although this necessarily entails the use of movable parts such as small doors, covers and hinges which, while providing access to their interiors, will also interfere with loading and unloading and will be likely to alter the cell characteristics when not repositioned precisely. Preferably, test cells which are intended to accept samples of massive bulk and/or to permit their being conveyed readily into and out of the measurement site are constructed in an open form, with permanently-defined access openings of substantial proportions in the external shielding. Stray or fringing fields of electrostatic flux from the exposed measurement site in cells of such form can be significantly reduced by simultaneously exciting the spaced internal capacitor plates with alternating voltages which are instantaneously of equal amplitudes and opposite polarities in relation to the reference or ground potential of the shielding, whereby the potential gradient between the plates is highly uniform and exhibits a ground level at substantially the mid position, such that the internal fields are thus not readily diverted to outside objects or personnel which are at or near the ground level. The aforesaid excitation is at very high frequencies which depend, in a large measure, upon the dielectric constants of the samples interposed between the electrode plates of the cell serving as a tuning capacitor for an associated oscillator. Consequently, even the most minute variations in circuit parameters tend to cause undesirable shifts in frequency and to unbalance the cell-plate voltages with resultant unwanted changes in the locus of the ground-level potential within the measurement region. A major source of such difficulties is found to reside in the intercouplings between the cell electrode plates and the associated oscillator tank circuit components. Both of these plates must be ungrounded and operated at high frequencies; for these reasons they both tend to occasion variable losses through radiation, and to exhibit uncertain stray capacitances which induce erroneous drifting of the oscillator frequency. Further complications result from asymmetry due to the unequal distances which, as a practical matter, will exist between the two cell plates and their connections into the oscillator tank circuitry.

According to a preferred practice of the present invention, the foregoing disadvantages and difficulties are overcome in stable measurement apparatus including an opened test cell structure in which the large-area partly-shielded electrode plates are each independently coupled with a different end of an associated centrally-grounded tuned oscillator circuit by a transmission line having substantially uniform distributed impedance characteristics, such as a coaxial cable, having its shielding grounded in common with that of the cell electrode plates. Inequalities in distributed capacitances in these coupling lines can be expected to influence the oscillator's sensitivities to the relatively small measurement-induced changes in the cell capacities, such that calibrations for different production units will not be the same; however, the other beneficial aspects of use of such shielded lines are uniquely made available without attendant loss of control over sensitivity characteristics, by the addition of series capacitance in the couplings. Other effects of the inequalities in the distributed capacitances of unavoidably different lengths of the shielded lines are also suppressed by the introduction of balancing shunt capacitance which adjusts the relative potentials of the electrode plates and fixedly centers the ground-level potential between them at the optimum position for suppression of stray field disturbances. Although relatively complex capacitance and tuned circuit interactions are involved, the needed circuit elements are few and inexpensive, and lend themselves to relatively simple adjustment.

Therefore, it is one of the objects of the present invention to provide improved measurement apparatus which is rendered responsive to capacitivity of materials accurately and with a predetermined sensitivity, and which is caused to exhibit preferred internal field gradients within a capacitor test cell.

Another object is to provide novel and improved electronic moisture-testing apparatus having an open-sided capacitor test cell uniquely coupled into a frequency-controlling circuit by way of a combination of shielded cabling and compensating capacitance elements.

A further object is to provide a stable and sensitive electronic moisture detector of uncomplicated and economical construction having a partly-shielded capacitor test cell which is connected as a component of a balanced oscillator circuit by shielded cabling together with capacitive elements affording compensatory adjustments for inequalities in cable lengths, variations in cell sensitivity, and improper location of a virtual ground-plane within the measurement field of the cell.

By way of a summary account of practice of this invention in one of its aspects, there is provided in an electronic moisture detection system an oscillator the output frequency of which is regulated in part by the capacitances exhibited by an open-sided partly-shielded test cell, the latter capacitances in turn being related to the dielectric characteristics of samples of material placed with the electrostatic measurement field of the cell for testing. The two spaced parallel plate electrodes which develop the measurement field are shielded rearwardly of their confronting surfaces, and the measurement space between them is at least partially open, permanently, to facilitate entrance and removal of the samples. For purposes of avoiding variable field leakages through the access opening, the potential gradient of the measurement field is preferably caused to exhibit a ground-level value about midway of the opening, as the result of excitations of the electrodes by the instantaneously equal and opposite potentials existing at the ends of relatively remote tank circuitry of a balanced oscillator. Each of the two plate electrodes is independently connected with the aforesaid tank circuitry by a somewhat different length of coaxial cable which has its outer conductor grounded at the same reference potential as that of the plate electrode shielding, this being the same potential as that about which the oscillator operation is balanced. Each of the two coaxial cables is in turn connected in series with a different one of two relatively large variable capacitors and in parallel with a different one of two relatively small variable capacitors, the adjustments of these capacitors being effective both to balance the plate electrode potentials and to control sensitivity to measurement cell capacitivity.

The subject matter regarded as inventive is particularly pointed out and distinctly claimed in the concluding portion of this specification. However, both as to preferred practices and constructions, and further in relation to objects and advantages thereof, this invention may best be understood through reference to the following description taken in connection with the accompanying drawings, wherein:

FIGURE 1 is a diagram, partly in block, schematic and pictorial forms, of improved open-cell electronic moisture detection apparatus constructed in accordance with these teachings and adapted for measurement of the moisture content of cones of yarn;

FIGURE 2 comprises a diagram of a system like that of FIGURE 1, with the test cell and frequency-determining circuit parameters being illustrated schematically;

FIGURE 3 is a schematic circuit representation of the frequency-determining elements of the same apparatus; and FIGURE 4 provides a partly cross-sectioned pictorial view of a test cell with improved coupling and further sensitivity-compensating provisions which are mounted within the cell itself.

The embodying system portrayed in FIGURE 1 includes a capacitance test cell unit 5 which is electrically connected with and into a tuned-circuit portion 6 of a balanced variable oscillator 7. In a known manner, the variable-frequency outputs from oscillator 7 are compared with those from a reference-frequency oscillator 8, in a mixer 9, and the resulting audio-frequency difference signals are applied to a detector-limiter unit 10 in which demodulation and limiting result in pulses of uniform amplitude and of periodicities corresponding to the differences in the output signals generated by the two oscillators. Discriminator 11, which is preferably of a non-resonant type, is excited by the output pulses from unit 10 and delivers related unidirectional currents to the indicating instrument 12, in the form of an ammeter. The displayed indications should accurately characterize the capacitivity of samples within the test cell, that is, the effect which they have upon the capacitance exhibited by that cell. Power excitation for the various components of the system is preferably derived from a known form of regulated power supply, not separately illustrated, to promote system stability. If desired, details of circuitry which may be employed for the block-diagrammed components of this system may be observed through reference to U.S. Patent No. 3,012,193, dated Dec. 5, 1961.

Variable oscillator 7 is of a specialy balanced type wherein the test cell 5 forms part of the frequency-determining tuned circuitry of a Hartley- or Colpitts-circuit oscillator, for example. The illustrated tank circuit 6 is of a preferred type grounded intermediate its ends and including two inductance halves $12_a$ and $12_b$ each in parallel with the halves $13_a$ and $13_b$, respectively, of a split stator balanced variable capacitor. As shown, the tank circuit interconnections include a grounding of the intermediate capacitor electrode structure $13_c$ with the center tap between the inductance halves. This grounded center tap tank circuit arrangement has an advantageous voltage-dividing effect tending to preserve its two end terminals $6_a$ and $6_b$ at potentials which are instantaneously equal but of opposite polarities in relation to the center grounding potential. If these end potentials are properly reproduced at the two spaced broad-area parallel electrode plates 14 and 15 of the test cell unit 5, the electrostatic field extending between these plates will have a predetermined uniform potential gradient wherein the ground-level potential (16, in FIGURE 2) occurs in a plane lying midway between the parallel electrode plates. A large access opening 17, bordered by the grounded conductive shielding 18 of the cell, is preferably disposed symmetrically in relation to the aforementioned simulated ground plane, and the electrostatic measurement field thus has a minimum tendency to become diverted to outside objects or personnel at about the ground potential. Measured samples, such as the illustrated cone of yarn 19 on the symmetrical insulating stand 20, can readily be placed within or removed from the central measurement region where the electrostatic field flux lines are parallel and uniformly distributed.

Accurate and stable measurements cannot be realized unless all effects materially influencing the tuning of the frequency-determining tank circuitry 6 are substantially constant and in balance. By way of example, the capacitances $18_a$ and $18_b$ (FIGURE 2) existing between grounded shielding 18 and each of the electrode plates 14 and 15, respectively, are designed to be about the same and may be preserved constant by suitable rigid mounting of the plates in relation to the shielding on stable insulation. However, the couplings of the electrode plates with and into the tank circuitry has posed major difficulties in that the connections used necessarily extend for some distances, are likely to be of at least slightly different distances, tend to exhibit unwanted capacitance with one another, and are commonly found to involve capacitances to ground and with one another which do not remain stable and unvarying. In overcoming such problems, the separate couplings in the improved equipment are in the form of fully-shielded lines 21 and 22, and, specifically, a known form of coaxial cabling. Unlike the common uses of such cables, wherein both the inner and outer conductors either serve to carry closed-loop currents or to guide electromagnetic waves, the illustrated uses rely instead upon the fact that there are relatively fixed distributed inter-conductor capacitances which do not vary significantly with changes in the conditions to which they are exposed. Such distributed capacitances $21_c$ and $22_c$ are represented in FIGURE 2, between the inner and outer conductors $21_a$ and $21_b$ and between the inner and outer conductors $22_a$ and $22_b$, respectively; although not specifically illustrated, it should be understood that these known cables preferably include a conventional form of low-loss dielectric insulation which preserves accurate predetermined radial spacing between the coaxial conductors, even in their flexible versions. Each of the inner conductors $21_a$ and $22_a$ is directly connected to a different one of electrode plates 14 and 15 and is shielded as fully along its length as possible for the intended purposes, with the outer conductors $21_b$ and $22_b$ being solidly grounded in common with the test cell shielding 18 at the reference-potential level of the center-tapping of the tank circuitry. Were the opposite ends of these inner conductors merely directly connected to the tank circuit terminals $6_a$ and $6_b$, the distributed capacitances $21_c$ and $22_c$, and the cell capacitance, in parallel circuit relationship, could have unsatisfactory effects upon the balance of the electrode voltage and the sensitivity of cell responses. Ordinarily, one would of course tend to avoid introducing such shunting distributed capacitances, for that reason. However, each of these opposite ends of inner conductors $21_a$ and $22_a$ is instead capacitively coupled to a different one of the tank circuit terminals $6_a$ and $6_b$, respectively, in series with a different one of the two adjustable capacitors 23 and 24, respectively, the selectable capacitance values of which are preferably made relatively large. Adjustments knobs $23_k$ and $24_k$ facilitate the manual setting of these capacitors to yield the specific capacitance values which produce optimum system operation. In addition, each of the pairs of inner and outer conductors is also shunted by, i.e. is connected in parallel with, a different one of the adjustable capacitors, 25 and 26, respectively, the selectable capacitance values of which preferably range from essentially zero to a value corresponding to at least the value of distributed capacitance (such as capacitances $21_c$ and $22_c$) by which the two shielded lines 21 and 22 can be expected to differ as the result of their differences in lengths; knobs $25_k$ and $26_k$ facilitate the needed manual settings.

Electrical circuit parameters and relationships of the cell and couplings associated with the system tank circuit are represented in the schematic diagram of FIGURE 3. There, and in FIGURE 2, the measured sample is characterized by dashed linework 27, and the effects of such samples upon the capacitance exhibited between the electrode plates are to be measured as an indication of the moisture content, for example, when the other characteristics (such as size and weight) are known or are fixed. Shunting capacitances $18_a$ and $18_b$, between the cell plates and their shielding, can be held low and substantially constant through selection of appropriate insulation and application of sound mechanical assembly practices. Importantly, through use of the fullyshielded cabling, the distributed capacitances $21_c$ and $22_c$ are also preserved constant, and thus errors from that type of problem are circumvented. To the extent that the absolute total values of the distributed capacitances in the two cables differ from one another, however, there can be error in the instantaneous levels of potential at the two electrode plates, which levels should be accurately equal and of opposite polarities in relation to ground (except of course when both plates are simultaneously being passed cyclically through the zero or ground-level potential). This error also results in undesirable shifting of the site of the simulated "ground plane" between the electrodes, such that the stray fields are not then suppressed in an optimum fashion. It is in this connection that the trimming adjustable shunt capacitors are particularly beneficial, and, when properly set, they provide a means for establishing that the totals of shunt capacitance associated with each of the electrode plates can be rendered equal; an excess of such shunt capacitance on one side, resulting from a longer cable there, is readily balanced on the other side by setting one of the shunt capacitors, 25 or 26, to supply the difference and establish capacitive balance. As a practical matter, this will generally involve reducing the capacitance of one and increasing the capacitance of the other of shunt capacitors 25 and 26. All of such shunt capacitance is in another sense undesirable, because it affects the test cell sensitivity to the capacitivity of the samples 27; this drawback can be of a serious character inasmuch as the cell sensitivities must be extremely high, as well as stable, and should be substantially the same for different production models using indicating instruments having like calibrations for the output readings. Accordingly, the selectable adjustments of cell sensitivity effected by series capacitors 23 and 24 are highly advantageous. When the latter capacitors are set to relatively small levels of capacitance, the changes in the capacitivity of the measured samples have a lesser effect upon the frequency of the associated variable oscillator than when these series capacitors are adjusted to exhibit higher capacitance. While the shunt capacitors 25 and 26 tend to lower the natural resonant frequency of the tank circuit, the series capacitors 23 and 24 have the opposite effect, tending to raise that resonant frequency. As in the case of the shunt capacitors, the series capacitors also afford a means for adjusting the relative values of instantaneous voltages appearing at the electrode plates, and, thereby, the locus of the simulated ground plane between them. Although maximum sensitivity results when the series capacitance is infinite (i.e. there are direct electrical connections), this permits no control over the sensitivity from one system to the next, and it is decidedly advantageous to include the series-capacitance elements as an adjustment enabling the sensitivities to be modified as needed to conform with a predetermined standard and to harmonize with a predetermined calibration for the readout instrument. Sensitivity losses which result from the added capacitance of the cables and adjustable capacitors are recovered, if necessary, by way of an offsetting increase in the normal frequency at which the reference and variable oscillators are designed to operate, the aforesaid series capacitors being effective to aid in an upward shift of the variable oscillator frequency.

Compensating sensitivity increases, which may be required for more precise measurements in those instances when the measured sample is particularly small in relation to the spacing between the electrode plates, may be induced by modifying the characteristics of the measurement space between these plates. One such modification is illustrated in FIGURE 4, wherein the same test cell is shown with a relatively small thread spool 28 in place upon the insulating support 20. The measurement space is there reduced in width, symmetrically, by the attachment to them of auxiliary conductive members 29 and 30, which need only have flat parallel surfaces of area slightly in excess of the sample cross-section. In alternative constructions, the gap-narrowing and sensitivity-increasing plate attachments may usefully comprise blocks of dielectric material with or without conductive facings. The compensatory increase in sensitivity is realized because reduction in effective spacing between the cell plates increases the capacitance between them; in turn, changes in the dielectric characteristics of measured samples will then cause greater changes in the capacitance exhibited by the cell. Shielded-cable couplings and associated adjusting capacitors for this modified cell permit its operation to be stabilized and adjusted for optimum performance.

A sensitivity-compensating cell construction of the type represented in FIGURE 4 need not utilize a single sample-holder, such as stand 20, which is fixed in position and serves to hold either a large or small sample; instead, the relatively large or small samples may be mounted on separate supports intended for them as the different needs arise. By way of example, where the reduced-width space occupies only part of the total cell cross-sectional area, such as the upper portion as shown in FIGURE 4, the cell may advantageously employ a thin horizontal shelf of insulating material such as nylon, just below the members 29 and 30, either to support the sample directly or to mount a separate small central stand for the sample. The stand 20 is then eliminated in favor of another which can be used to mount the larger samples from the floor of the cell without interfering with the shelf. The narrower portion of the cell may of course be left intact while only the wider portion is being used for large-sample measurements.

The test cell configurations and proportions may of course be varied to meet requirements and convenience in the testing of materials and samples of size, shape and consistency unlike those of the cone and spool of textile material which have been referred to. Similarly, the particular electronic detection system selected for illustration and discussion may assume other forms in which the improved couplings and associated adjustment provisions will be beneficial. Although the common coaxial cable represents a convenient highly stable form of transmission line exhibiting the desired uniform distribution of impedance characteristics, particularly capacitive impedance, the lines may be of other constructions exhibiting like characteristics and functioning in essentially the same beneficial way in the improved apparatus. It is contemplated that these transmission lines may also be intentionally proportioned in lengths which will cause the electrode plate voltages to assume desired relative values and will locate the simulated ground plane at a desired position; when cut to unequal lengths which offer desired unequal values of distributed capacitance, these lines will themselves effect an advantageous counterbalancing of test cell inequalities, such as the unequal capacitances between the respective electrode plates and the shielding for them. Auxiliary capacitors may thus be eliminated in some instances. The adjusting capacitors may also be located at sites alternative to those selected in the preferred embodiment, and auxiliary inductances may also be used to effect certain further tunings.

What we claim as new and desire to secure by Letters Patent of the United States is:

1. Test cell apparatus which is responsive to the capacitivity of substances and is adapted to be coupled into a measurement system, comprising a pair of capacitor test cell electrodes, an enclosure of conductive material having an access opening therethrough, means mounting said electrodes within said enclosure in insulated relationship thereto and to one another and with a hollow measurement region therebetween communicating with said access opening, an electrical frequency-determining circuit for developing at two terminals thereof alternating-current potentials which are simultaneously of opposite polarities in relation to a reference ground potential, a pair of shielded lines each including a first conductor and a second conductor substantially coextensive therewith and in spaced electrically-insulated and shielding relationship thereto, means maintaining said second conductor of each of said lines and the conductive material of said enclosure at said reference ground potential of said frequency-determining circuit, and means electrically coupling one end of each said first conductor with a different one of said cell electrodes and the other end of each said first conductor with a different one of said two terminals of said frequency-determining circuit, said lines each exhibiting distributed capacitance between the conductors thereof and thereby affecting the relative values of instantaneous potentials exhibited by said cell electrodes, each of said shielded lines comprising a coaxial cable in which said second conductor is in concentric surrounding relation to said first conductor, said coupling means including direct electrical connections between each said one end of said first conductor and a different one of said cell electrodes, means for adjusting the sensitivity of said frequency-determining circuit to changes in capacitance exhibited by said test cell in circuit with said cables, and wherein said means for adjusting said sensitivity includes a pair of like members each of material which interacts with the electrostatic field of said test cell, and means for mounting said members each on a different one of said electrodes in confronting relationship to one another within said measurement region with a predetermined spacing therebetween which is less than the spacing between said electrodes, said members being directly connected to the electrodes and being at the same potential as the electrodes.

2. Test cell apparatus which is responsive to the capacitivity of substances and is adapted to be coupled into a measurement system, comprising a pair of capacitor test cell electrodes, an enclosure of conductive material having an access opening therethrough, means mounting said electrodes within said enclosure in insulated relationship thereto and to one another and with a hollow measurement region therebetween communicating with said access opening, an electrical frequency-determining circuit for developing at two terminals thereof alternating-current potentials which are simultaneously of opposite polarities in relation to a reference ground potential, a pair of shielded lines each including a first conductor and a second conductor substantially coextensive therewith and in spaced electrically-insulated and shielding relationship thereto, means maintaining said second conductor of each of said lines and the conductive material of said enclosure at said reference ground potential of said frequency-determining circuit, and means electrically coupling one end of each said first conductor with a different one of said cell electrodes and the other end of each said first conductor with a different one of said two terminals of said frequency-determining circuit, said lines each exhibiting distributed capacitance between the conductors thereof and thereby affecting the relative values of instantaneous potentials exhibited by said cell electrodes, each of said shielded lines comprising a coaxial cable in which said second conductor is in concentric surrounding relation to said first conductor, said coupling means including direct electrical connections between each said one end of said first conductor and a different one of said cell electrodes, means for adjusting the sensitivity of said frequency-determining circuit to changes in capacitance exhibited by said test cell in circuit with said cables, said means for adjusting said sensitivity including variable capacitor means, and means connecting said variable capacitor means in series with the series combination of said first conductors of said cables and said electrodes, said variable capacitor means including a first pair of variable capacitors, and said connecting mens connecting each of said variable capacitors in series between a different one of said terminals and a different one of the said other ends of said first conductors, and wherein said coupling means includes a second pair of variable capacitors, and means connecting each of said second pair of variable capacitors in parallel with a different one of said cables directly between the said first and second conductors thereof, whereby said variable capacitors may be adjusted to control the relative values of alternating current potentials at said electrodes, the locus of alternating current reference ground potential between said electrodes, and the sensitivity of the system to changes in capacitance exhibited between said electrodes.

References Cited

UNITED STATES PATENTS

| | | | |
|---|---|---|---|
| Re. 23,368 | 5/1951 | Grob et al. | 324—61 |
| 2,431,841 | 12/1947 | Storm | 324—61 |
| 2,519,668 | 8/1950 | Konigsberg | 324—61 XR |
| 2,923,880 | 2/1960 | Mayes | 324—61 XR |
| 3,028,548 | 4/1962 | Breen | 324—61 |
| 3,031,617 | 4/1962 | Paquette | 324—61 |
| 3,284,706 | 11/1966 | Benson | 324—61 |
| 3,355,664 | 11/1967 | Pranke | 324—61 |

FOREIGN PATENTS 199226  10/1938  Switzerland.   324—61

RUDOLPH V. ROLINEC, *Primary Examiner.*

E. E. KUBASIEWICZ, *Assistant Examiner.*